(12) United States Patent
Kim et al.

(10) Patent No.: US 8,689,813 B2
(45) Date of Patent: Apr. 8, 2014

(54) VALVE FOR PREVENTION OF FROZEN BREAK USING PHASE CHANGE MATERIAL

(75) Inventors: Joung Ha Kim, Cheonan-si (KR); Jae Ho Yun, Yongin-si (KR); Sung Hyun Kim, Seoul (KR)

(73) Assignee: Korea Institute of Industrial Technology (KR)

( * ) Notice: Subject to any disclaimer, the term of this patent is extended or adjusted under 35 U.S.C. 154(b) by 124 days.

(21) Appl. No.: 13/322,251

(22) PCT Filed: May 25, 2009

(86) PCT No.: PCT/KR2009/002756
§ 371 (c)(1),
(2), (4) Date: Jan. 27, 2012

(87) PCT Pub. No.: WO2010/137749
PCT Pub. Date: Dec. 2, 2010

(65) Prior Publication Data
US 2012/0112114 A1 May 10, 2012

(51) Int. Cl.
*F16K 31/64* (2006.01)
*E03B 7/10* (2006.01)

(52) U.S. Cl.
USPC .............................................. 137/62; 137/79

(58) Field of Classification Search
USPC ......... 137/62, 79; 251/324; 237/80; 236/93 R
See application file for complete search history.

(56) References Cited

U.S. PATENT DOCUMENTS

| | | | | |
|---|---|---|---|---|
| 4,066,090 A | * | 1/1978 | Nakajima et al. | 137/62 |
| 4,205,698 A | * | 6/1980 | Hucks | 137/62 |
| 4,296,770 A | * | 10/1981 | Rice | 137/62 |
| 4,460,006 A | | 7/1984 | Kolze | |
| 4,776,362 A | | 10/1988 | Domingue, Sr. et al. | |
| 5,628,285 A | * | 5/1997 | Logan et al. | 137/62 |
| 6,003,538 A | * | 12/1999 | Smith | 137/79 |
| 6,363,960 B1 | * | 4/2002 | Gauss | 137/62 |
| 7,407,113 B2 | * | 8/2008 | Guterman | 137/62 |

FOREIGN PATENT DOCUMENTS

JP 08-219598 A 8/1996
KR 10-2003-0061603 A 7/2003

OTHER PUBLICATIONS

International Search Report issued in connection with PCT/KR2009/002756 on Feb. 22, 2010.

* cited by examiner

*Primary Examiner* — Kevin Lee
(74) *Attorney, Agent, or Firm* — Levenfeld Pearlstein LLC (57) ABSTRACT

A valve for preventing freeze-fracturing prevents accidental freeze-fracturing due to the freezing of water by draining water from a flow pipe before the danger of freezing occurs when the temperature of ambient air drops. The valve for preventing freeze-fracturing includes a housing coupled to a pipe port and a draining chamber provided in a portion of the housing that faces the pipe port. The draining chamber has therein a water inlet hole, which communicates with an inside of the flow pipe, and a water outlet hole, which communicates with an outside of the housing. A storage chamber is provided in a portion of the housing that is opposite the draining chamber, and contains therein a phase change material, which decreases in volume while changing in phase from liquid to solid. A plunger is movably disposed in the draining chamber to open and close the water inlet hole.

9 Claims, 8 Drawing Sheets

VALVE FOR PREVENTION OF FROZEN BREAK USING PHASE CHANGE MATERIAL

CROSS-REFERENCE TO RELATED APPLICATIONS

This is a National Stage Application of International Patent Application No. PCT/KR2009/002756, filed May 25, 2009, the contents of which are incorporated fully by reference herein.

TECHNICAL FIELD

The present invention relates to a valve for preventing freeze-fracturing using a phase change material, and more particularly, to a valve for preventing freeze-fracturing using a phase change material, which can prevent a pipe from freezing by discharging water from the pipe in advance, before the temperature of ambient air drops below the freezing temperature of water.

BACKGROUND ART

In general, water is used as a heat exchange medium in a variety of equipment and facilities, such as cooling/heating air conditioning facilities, refrigerating and freezing facilities and industrial freezing facilities. In particular, a heat exchanger coil, an evaporating cooling tower or the like of a water cooling condenser or an air conditioner is highly vulnerable to accidents in which a pipe that is exposed to ambient air is fractured due to freezing when the water inside the pipe freezes when the temperature drops below zero, for example, during the winter.

The freeze-fracturing of the pipe in such equipment and facilities causes loss of water resources due to leakage and other losses, such as damage and breakage to the equipment and surrounding facilities. Since it consumes a lot of time and expense to replace and repair the facilities, attempts and measures to effectively prevent freeze-fracturing in advance are demanded.

Although the water inside a closed pipe is not easily frozen when it is flowing, it is easily frozen when the temperature decreases if its flow is stopped. Since water exhibits a volumetric increase of about 10% in the process of changing in phase from liquid to solid, the pipe is subjected to freeze-fracturing, exhibiting a crack or fracture if the pressure of the expansion of water exceeds the endurance strength of the pipe.

Typical attempts to prevent such freeze-fracturing employ a method of installing a heat-retaining article or a heating device inside a pipe, a method of mixing an antifreeze solution, such as brine, into water, a method of keeping water flowing by continuously draining water from the pipe, etc. However, such methods have problems, for example, in that an additional heat-retaining article or heating device must be installed, in that the operation of the heating device consumes a large amount of energy, and in that the drainage of water wastes water resources.

In the meantime, as a device for preventing accidental freeze-fracturing in a pipe, proposed is a safety plug for preventing freeze-fracturing, which transfers the pressure of expansion to the outside by opening/closing a valve using upward/downward movement due to the pressure of expansion, and prevents water from leaking by automatically closing the channel through which water is forced in. However, since the plug is configured such that a tearing member is fractured to drain water when the pressure of expansion is excessive, there is a drawback in that it is disadvantageous in terms of maintenance since time and expense associated with labor and materials are consumed when replacing the broken tearing member with a new one.

DISCLOSURE

Technical Problem

The present invention has been made to solve the foregoing problems, and is intended to provide a valve for preventing freeze-fracturing using a phase change material, which can prevent accidental freeze-fracturing due to the freezing of water by draining water from a pipe before the danger of freezing occurs when the temperature of ambient air drops to the freezing temperature of water or lower.

Technical Solution

In order to realize the foregoing object, the valve for preventing freeze-fracturing of the present invention provides includes a housing coupled to a pipe port of a flow pipe through which a fluid flows and a draining chamber provided in a portion of the housing that faces the pipe port. The draining chamber has therein a water inlet hole, which communicates with an inside of the flow pipe, and a water outlet hole, which communicates with an outside of the housing. A storage chamber is provided in a portion of the housing that is opposite the draining chamber. The storage chamber contains therein a phase change material, which decreases in volume while changing in phase from liquid to solid. A plunger is movably disposed in the draining chamber. The plunger has a piston in one portion thereof, the piston being positioned inside the storage chamber such that the piston moves following a change in the volume of the phase change material, and a valve in the other portion thereof, the valve opening and closing the water inlet hole following a movement of the piston.

In the valve for preventing freeze-fracturing of the present invention, the draining chamber and the storage chamber may be integrated to the housing. The housing has a piston hole between the draining chamber and the storage chamber, the piston of the plunger being received inside the piston hole.

In this case, it is preferred that the housing have a draining chamber stopper, which is screw-coupled to the draining chamber from an outside, the draining chamber stopper having the water inlet hole therein.

In addition, it is preferred that the housing have a storage chamber stopper, which is screw-coupled to the storage chamber from an outside, the storage chamber stopper having an inlet hole, which is opened or closed by an opening/closing bolt.

It is preferred that a spring be provided in the draining chamber, the spring elastically supporting the plunger in a direction toward an inside of the storage chamber.

It is more preferred that a valve seat be provided around the water inlet hole of the draining chamber stopper, and that a packing be provided to form a seal between the valve of the plunger and the valve seat.

In the valve for preventing freeze-fracturing of the present invention, the housing may be configured such that it has open both ends, such that a connector, which forms the draining chamber, is provided in one end of the housing, and a cartridge, which forms the storage chamber, is provided in the other end of the housing.

In this case, it is preferred that the cartridge be a container, which is received in and is screw-coupled to the housing, and that a container stopper be coupled to a portion of the cartridge that is outside the housing, the container stopper being opened and closed in order to supply the phase change material.

It is more preferred that a spring be provided inside the cartridge, the spring elastically supporting the piston of the plunger toward an inside of the cartridge.

Advantageous Effects

The valve for preventing freeze-fracturing of the present invention, which is configured as above, has the following effects:

(1) The opening operation of the valve is automatically carried out using the contracting force of the phase change material, which is solidified and decreases in volume when the temperature drops. Consequently, it is possible to drain water to the outside before water in the pipe is frozen, thereby preventing freeze-fracturing, and to save labor and time, which would otherwise be consumed in the management of the pipe.

(2) The plunger is elastically supported in the direction toward the inside of the storage chamber by the spring. Consequently, the operation of opening the valve can be executed more efficiently and correctly, thereby improving the reliability of operation.

(3) The draining chamber stopper and the storage chamber stopper are provided such that they are screw-coupled to the draining chamber and the storage chamber of the housing, respectively, so that the opening and closing positions of the valve can be easily adjusted following the rotation of the draining chamber stopper and the pressure of the phase chamber material, which is applied to the plunger, can be easily adjusted following the rotation of the storage chamber stopper. Therefore, it is possible to increase compatibility by simply setting a temperature, pressure or the like where the valve is opened/closed depending on the conditions and purposes of use.

(4) The injection hole, which is opened/closed by the opening/closing bolt, is provided in the storage chamber stopper of the storage chamber. This makes it easy to load the phase change material when initially supplying it as well as when replenishing it, thereby further improving the convenience of maintenance.

(5) The storage chamber of the housing is implemented as a separate cartridge, which has the form of a container and is detachably coupled to the housing. Consequently, it is possible to simply replace the cartridge by detaching it, thereby decreasing costs and labor that would otherwise be consumed for maintenance.

(6) The cartridge, which forms the storage chamber, is provided with the cartridge stopper. This makes it easy to load the phase change material when initially supplying it as well as when replenishing it, thereby further improving the convenience of maintenance.

| <Major Reference Numerals of the Drawings> | |
| --- | --- |
| 10: flow pipe | 11: pipe port |
| 20: phase change material | |
| 100: valve for preventing freeze-fracturing | |
| 110: housing | 111: draining chamber |
| 112: storage chamber | 113: water outlet hole |
| 115: piston hole | |
| 120: draining chamber stopper | |
| 121: water inlet hole | 130: spring |
| 131: packing | 140: plunger |
| 141: piston | 143: valve |
| 144: support protrusion | |
| 150: storage chamber stopper | |
| 151: inlet hole | 152: opening/closing bolt |
| 210: housing | 211: draining chamber |
| 212: storage chamber | 213: water outlet hole |
| 220: connector | 221: water inlet hole |
| 230: cartridge | 231: cartridge stopper |
| 232: packing | 240: plunger |
| 241: piston | 243: valve |

MODE FOR INVENTION

The above-described aspects, features and advantages of the present invention will be more apparent from the following detained description. Exemplary embodiments of the present invention will be described more fully hereinafter with reference to the accompanying drawings.

Figure 1:
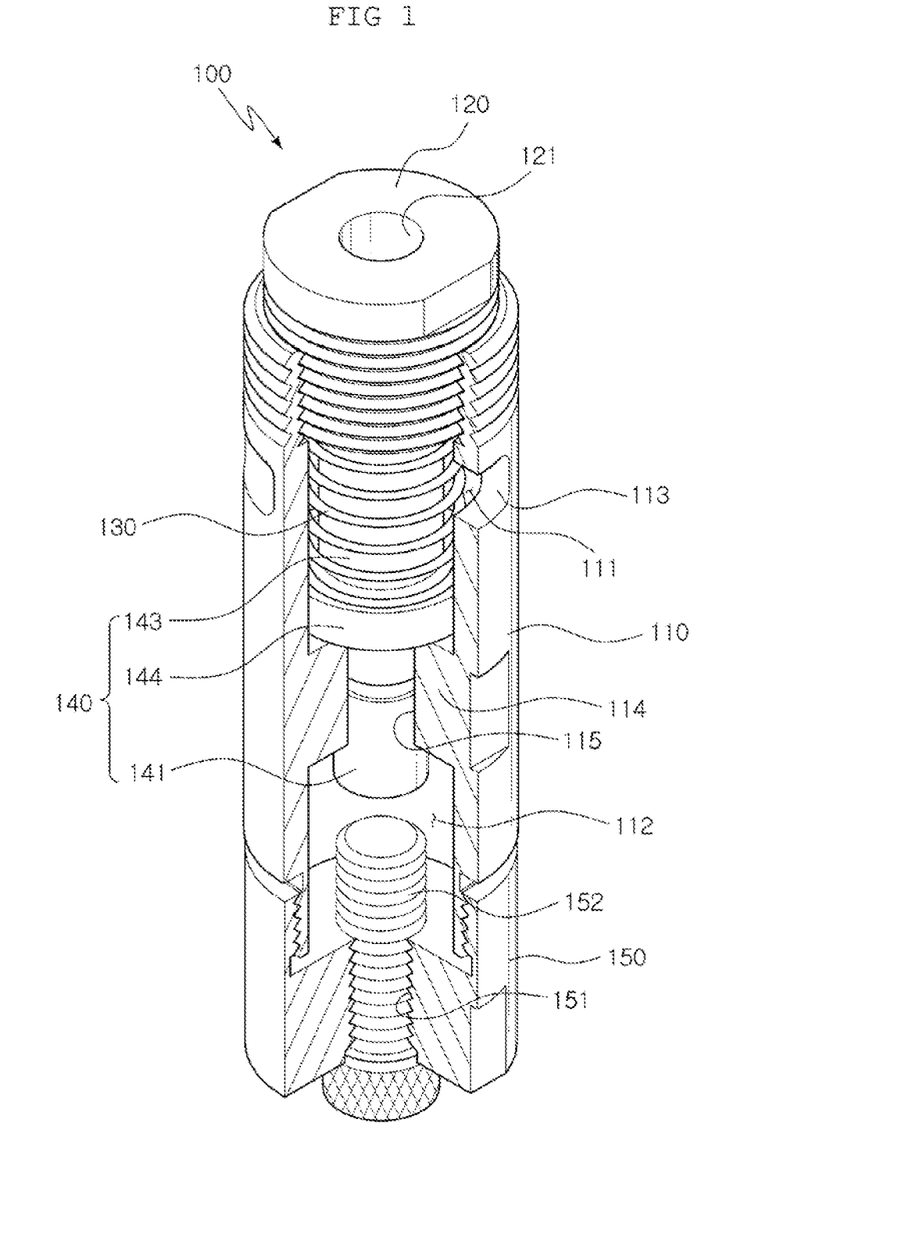
FIG. 1 is a perspective view showing the assembled state of a valve for preventing freeze-fracturing according to a first embodiment of the present invention.
Figure 2:
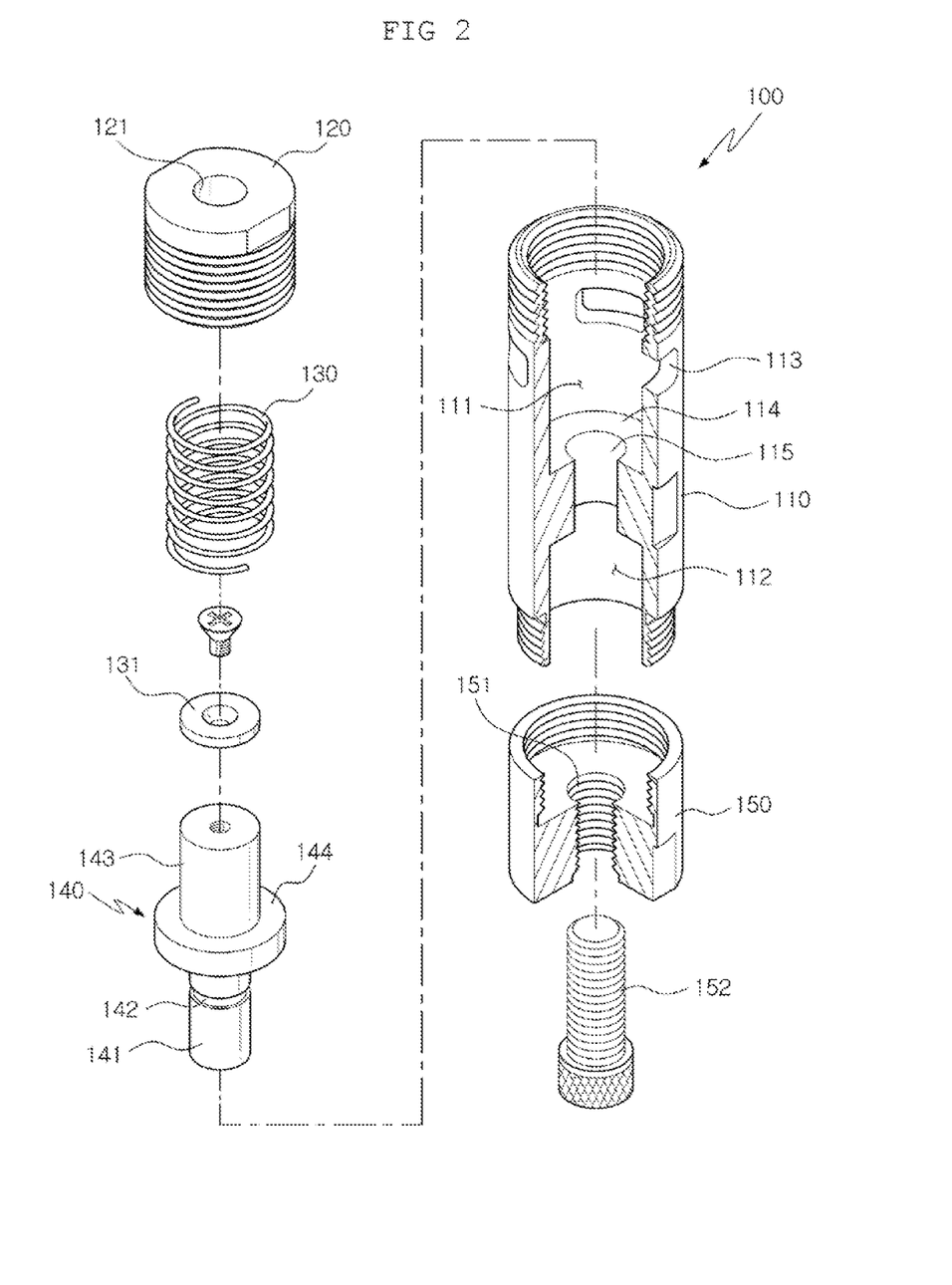
FIG. 2 is a perspective view showing the exploded state of the valve for preventing freeze-fracturing of the first embodiment.
Figure 3:
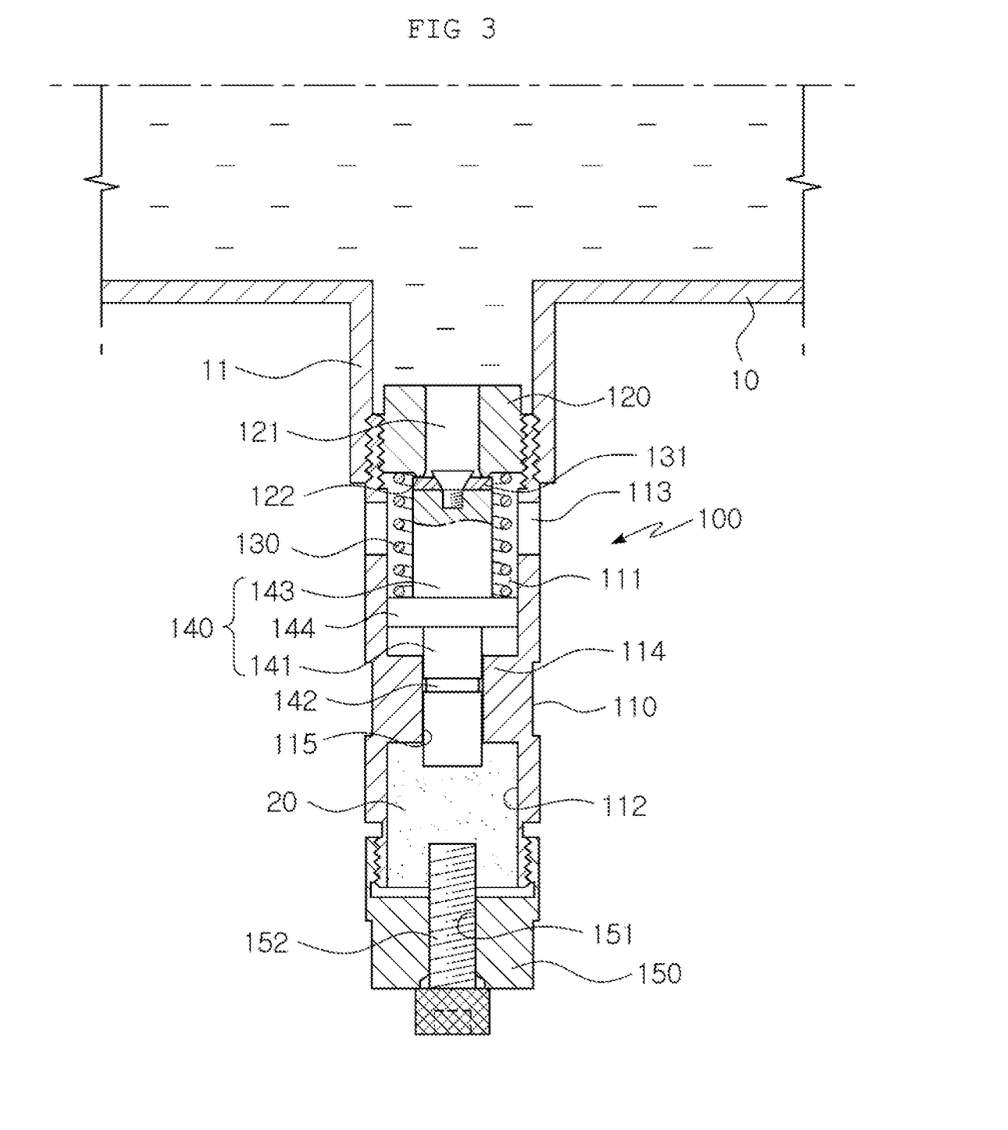
FIG. 3 is a cross-sectional view showing the closing operation of the valve for preventing freeze-fracturing of the first embodiment.
Figure 4:
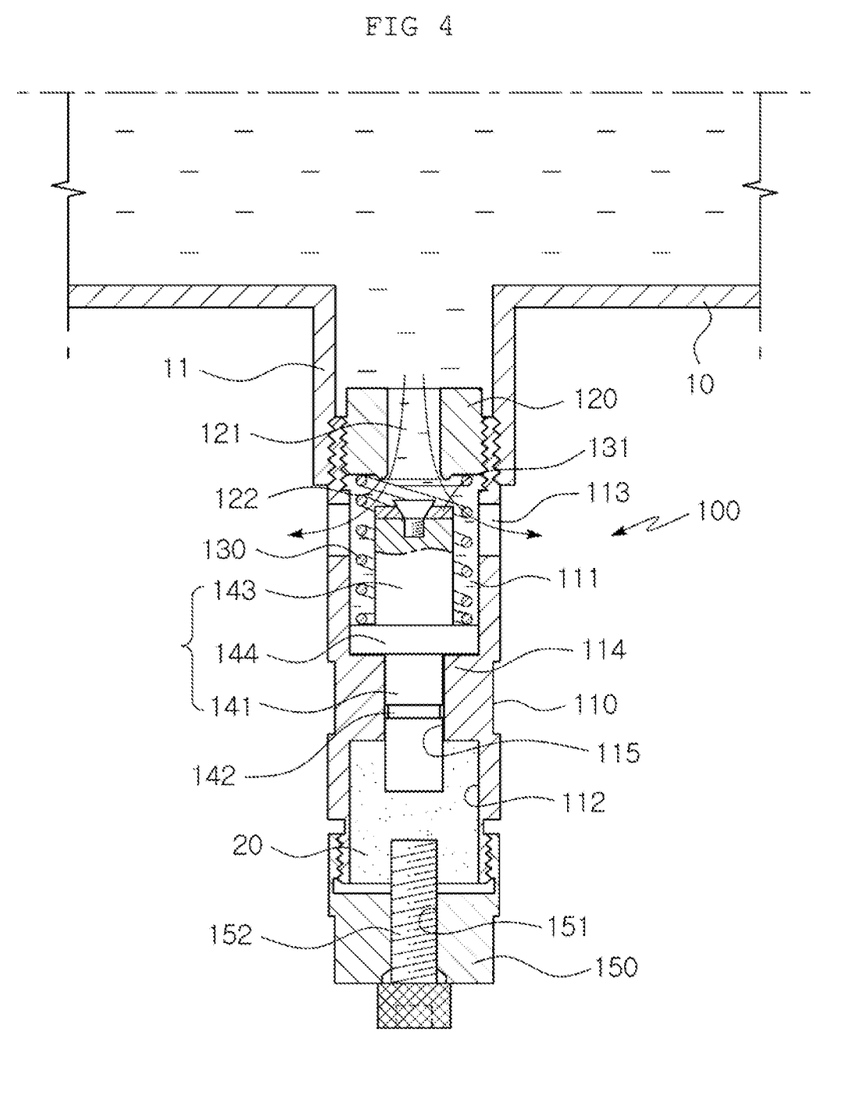
FIG. 4 is a cross-sectional view showing the opening operation of the valve for preventing freeze-fracturing of the first embodiment.

FIG. 1 and FIG. 2 are perspective views showing, respectively, the assembled state and exploded state of a valve for preventing freeze-fracturing according to a first embodiment of the present invention, and FIG. 3 and FIG. 4 are cross-sectional views showing, respectively, the closing operation and opening operation of the valve for preventing freeze-fracturing of the first embodiment.

As shown in the figures, the valve for preventing freeze-fracturing 100 of the present invention is coupled to a pipe port 11, which is diverged from a flow pipe 10 for the purpose of measuring the temperature of water or the like. A plunger 140 is configured such that it moves in response to changes in the volume of a phase change material 20, which is contained in a housing 110, to open or close the inside of the flow pipe 10 to or from the outside.

The phase change material C employs an inclusion compound or a eutectic salt. Describing the properties thereof, the inclusion compound or eutectic salt remains in a liquid state at room temperature, changes into a solid at a low temperature (preferably from 2° C. to 5° C.) that is slightly higher than the freezing temperature of water, which is 0° C., and decreases in volume when its phase changes from liquid to solid, in contrast to water, which increases in volume when frozen.

One end of the housing 110 is screw-coupled to the pipe port 11, and a draining chamber 111, which communicates with the inside of the flow pipe 10, is provided inside the portion of the housing 110, which is coupled to the pipe port 11. A storage chamber 112, which contains the phase change material 20 therein, is provided inside the portion that is opposite the draining chamber 111. In the middle portion, provided are an inward protrusion 114, which divides the draining chamber 111 and the storage chamber 112 from each other, and a piston hole 115, which allows the draining chamber 111 and the storage chamber 112 to communicate with each other.

A draining chamber stopper 120 is screw-coupled to the inner circumference of the longitudinal end of the draining chamber 111. The draining chamber stopper 120 has a water inlet hole 121, through which water is introduced from the flow pipe 10. A valve seat 122 is provided around the water inlet hole 121 inside the draining chamber stopper 120. A plurality of water outlet holes 113 is formed in the side wall of the draining chamber 111, such that water that was introduced into the draining chamber 111 is drained to the outside through the water outlet holes 113.

A storage chamber stopper 150 is screw-coupled to the inner circumference of the longitudinal end of the storage chamber 112. An inlet hole 151, through which the phase change material 20 is loaded, is formed in the storage chamber stopper 150. An opening/closing bolt 152 is fitted into and coupled to the inlet hole 151.

The plunger 140 is housed inside the draining chamber 111 such that it is movable in the longitudinal direction. A piston 141, which is inserted into the piston hole 115, is provided in one portion of the plunger 140, and a valve 143, which closes or opens the water inlet hole 121 depending on its position, is provided in the other portion of the plunger 140. A support protrusion 144 is provided between the piston 141 and the valve 143.

A ring groove 142 is formed in at least one of the outer circumference of the piston 141 and the inner circumference of the piston hole 115, such that an O-ring (not shown), which acts as a sealing means, is coupled to the ring groove 142.

A spring 130 is provided inside the storage chamber 112 of the housing 110, such that one end of the spring 130 is in contact with the draining chamber stopper 120 and the other end of the spring 130 is in contact with the support protrusion 144. The spring 130 elastically supports the plunger 140 toward the inner protrusion 114 of the housing 110.

A packing 131, which provides a water seal when the water inlet hole 121 is closed, is provided between the valve 143 of the plunger 143 and the draining chamber stopper 120.

The valve for preventing freeze-fracturing 100 of the present invention, which is configured as above, can be easily installed by coupling the housing 110 to the pipe port 11 such that the housing 110 is fitted into the inside of the pipe port 11 in the state in which the draining chamber stopper 120 faces upward.

When installed as described above, the valve for preventing freeze-fracturing remains in the closed state, as shown in FIG. 3, at a temperature where there is no danger of freeze-fracturing. Specifically, since the phase change material 20 contained in the storage chamber 112 of the housing 110 is in a liquid state, i.e. in the state in which its volume has increased, the pressure of the phase change material 20 is applied to the piston 141, so that the plunger 140 remains in the position in which it is raised up. Consequently, the packing 131 stays in tight contact with the valve seat 122 so that the water inlet hole 121 is closed by the valve 143, thereby preventing water in the flow pipe 10 from draining to the outside.

In this state, when the temperature of ambient air drops close to the freezing temperature of water, it is switched to the open state, as shown in FIG. 4. Specifically, the phase change material in the storage chamber 112 freezes and is transformed into a solid while decreasing in volume. The pressure applied to the piston 141 is then decreased, so that the plunger 140 is moved downward. Consequently, the water inlet hole 121, which has been closed by the valve 143 and the packing 131, is opened, so that the water inside the flow pipe 10 flows into the draining chamber 111 and is then drained through the outlet holes 113 to the outside.

When the temperature ambient air increases, the phase change material C is liquefied and the plunger 140 is then moved upward in response to an increase in the volume of the phase change material C, so that the water inlet hole 121 is closed again by the valve 143 and the packing 121.

As described above, the valve for preventing freeze-fracturing of the present invention is automatically operated to open when the temperature of ambient air drops so that it drains the water in the flow pipe 10 to the outside before the water freezes, thereby protecting the flow pipe 10 from freeze-fracturing. In addition, since neither repair nor replacement is required during the use of the valve, it is also possible to save labor and time, which would otherwise be consumed in maintenance.

In addition, since the plunger 140 is elastically supported by the spring 130, the operation of opening the valve can be executed more efficiently and correctly.

Furthermore, the draining chamber stopper 120 of the draining chamber 111 and the storage chamber stopper 120 of the storage chamber 112 are screw-coupled to the housing 110, so that the opening and closing positions of the valve can be easily adjusted following the rotation of the draining chamber stopper 120 and the pressure of the phase change material 20, which is applied to the plunger 140, can be easily adjusted following the rotation of the storage chamber stopper 150. Therefore, it is possible to advantageously ensure compatibility with a variety of pipes by simply setting a temperature, pressure or the like where the valve is opened/closed depending on the conditions and purposes of use.

In addition, the injection hole 151, which is opened or closed by the opening/closing bolt 152, is provided in the storage chamber 112. This advantageously makes it easy to load the phase change material when initially supplying it as well as when replenishing it after it has been used for a certain time period, thereby further improving the convenience of maintenance.

In the foregoing embodiment, the draining chamber stopper 120 and the storage chamber stopper 120 have been illustrated as separate parts, which are respectively coupled to the draining chamber 111 and the storage chamber 112 of the housing 110. Alternatively, a wall may be integrally formed at the distal end of the housing 110, such that it encloses the draining chamber 111 or the storage chamber 112 in order to replace the draining chamber stopper 120 or the storage chamber stopper 150, and the water inlet hole 121 or the inlet hole 151 may be formed in the wall. Furthermore, the draining chamber stopper 120 and the storage chamber stopper 150 may be coupled using other structures than the screw-coupling structure. Examples of such structures include an interference fit structure, a structure which fixes a stopper using a protrusion or hook after the stopper is inserted, etc.

Figure 5:
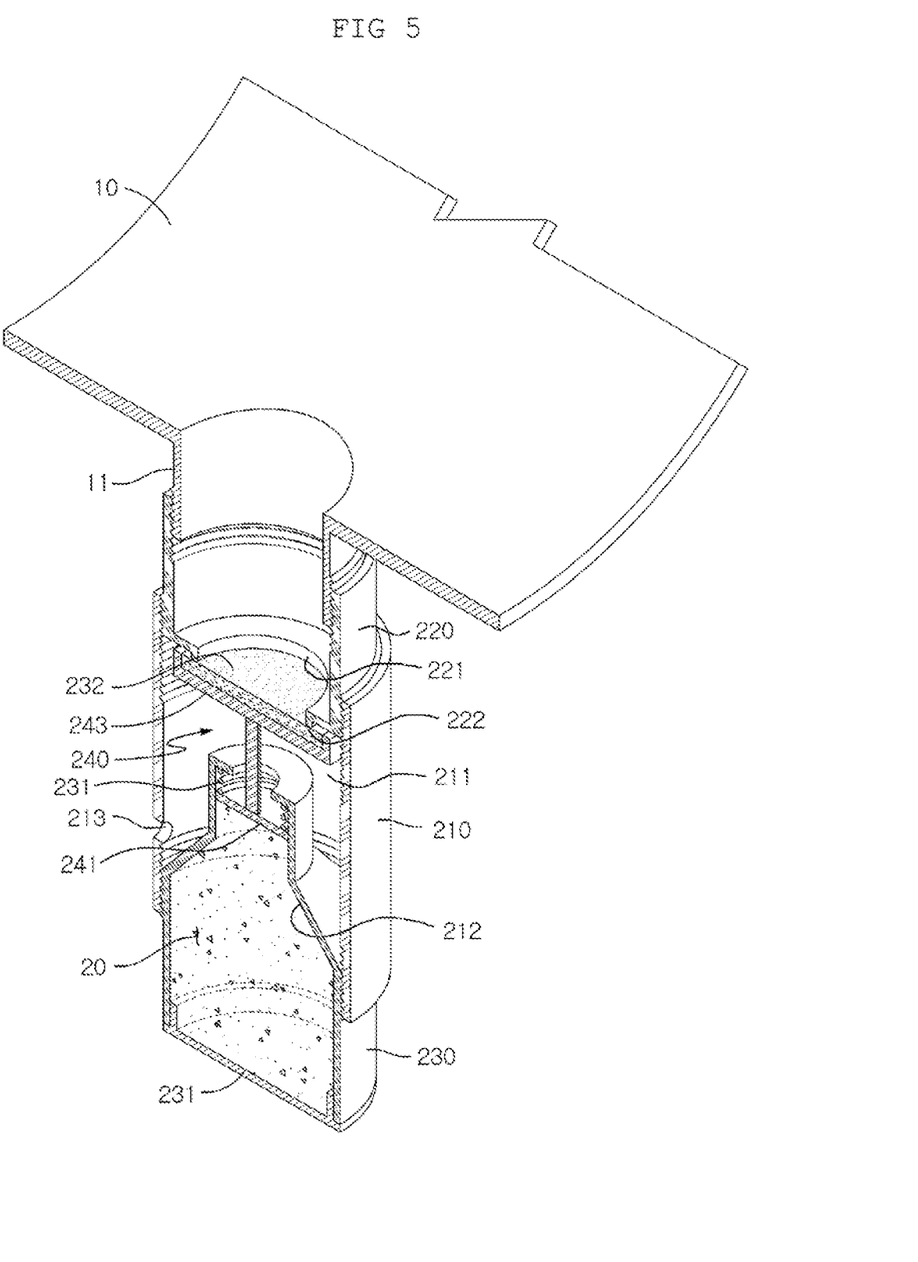
FIG. 5 is a perspective view showing the assembled state of a valve for preventing freeze-fracturing according to a second embodiment of the present invention.
Figure 6:
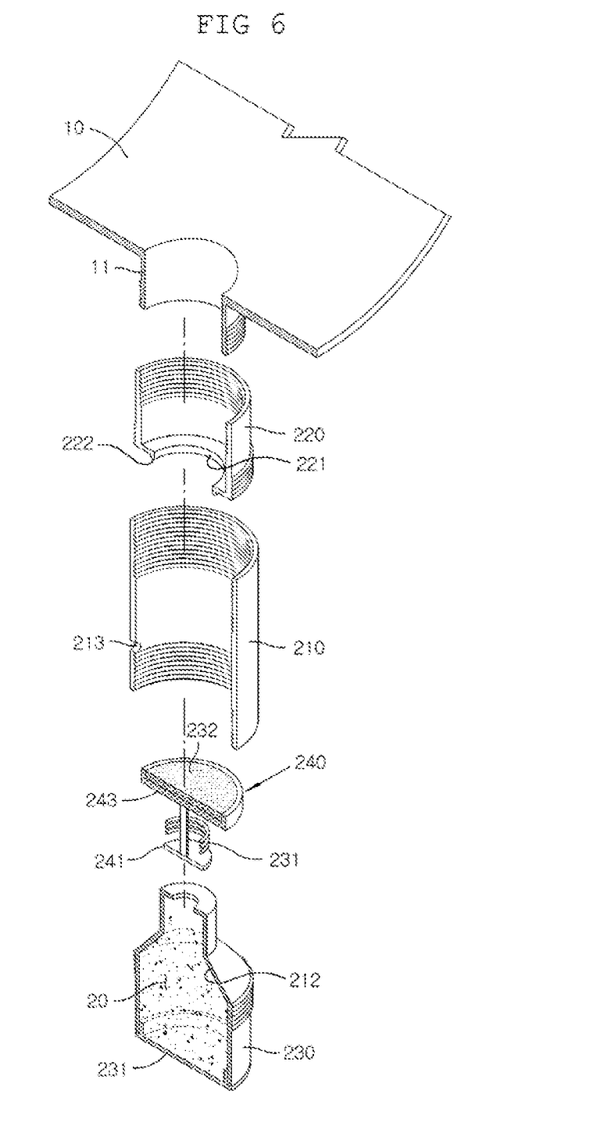
FIG. 6 is a perspective view showing the exploded state of the valve for preventing freeze-fracturing of the second embodiment.
Figure 7:
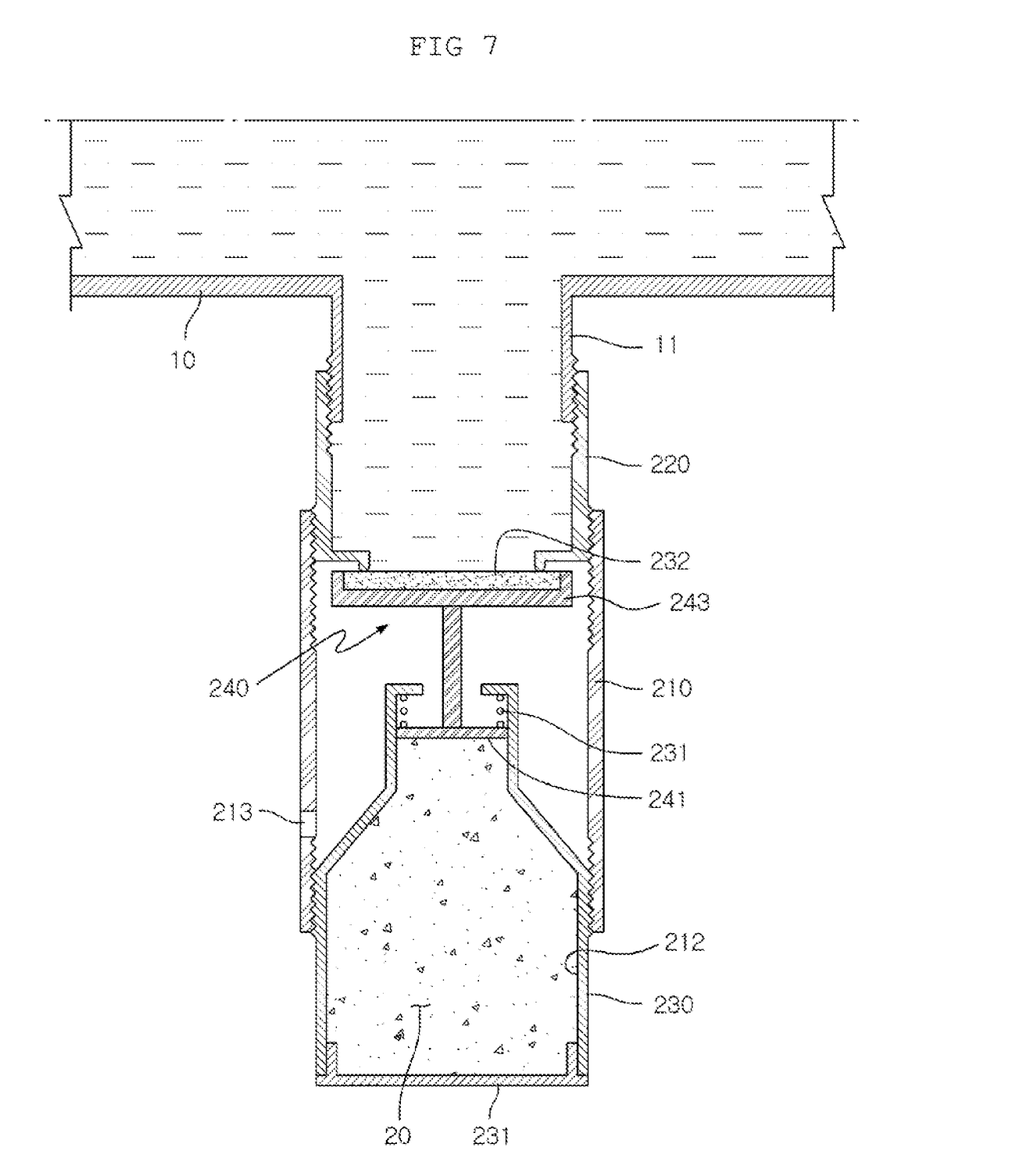
FIG. 7 is a cross-sectional view showing the closing operation of the valve for preventing freeze-fracturing of the second embodiment.
Figure 8:
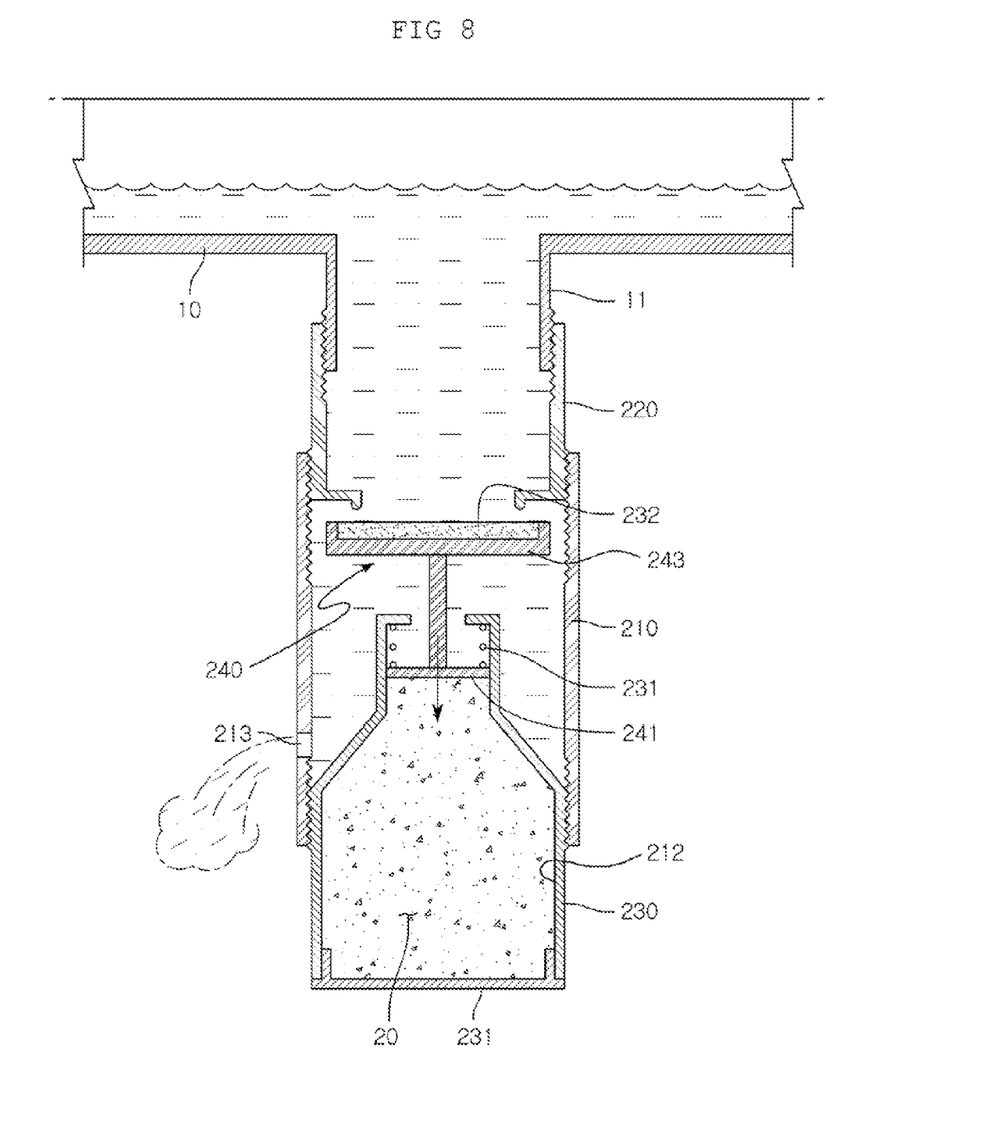
FIG. 8 is a cross-sectional view showing the opening operation of the valve for preventing freeze-fracturing of the second embodiment.

FIG. 5 and FIG. 6 are perspective views showing the respective assembled state and exploded state of a valve for preventing freeze-fracturing according to a second embodiment of the present invention, and FIG. 7 and FIG. 8 are cross-sectional views showing the respective closing operation and opening operation of the valve for preventing freeze-fracturing of the second embodiment.

As shown, in the valve for preventing freeze-fracturing of the second embodiment, like the above-described first embodiment, a draining chamber 211, which communicates with the inside of a flow pipe 10, and a storage chamber 212, which contains a phase change material 20 therein, are provided inside a housing 210, which is coupled to a pipe port 11, and a plunger 240 is provided such that it can move in response to a change in the volume of the phase change material 20. The draining chamber 211 is defined by a connector 220, which is coupled to the upper portion of the housing 210, and the storage chamber 212 is implemented as a separate cartridge 230, which is coupled to the lower portion of the housing 210.

In this embodiment, the housing 210 is formed as a single pipe, with the upper and bottom portions thereof being open. The housing 210 has, in at least one portion thereof, a water outlet hole 213, which communicates the draining chamber 211 with the outside.

The upper and lower portions of the connector 220 are screw-connected to the pipe port 11 and the housing 210, respectively, such that both parts communicate with each other. The connector 220 has a water inlet hole 221 in the lower portion thereof, and a valve seat 222, which protrudes downward, is provided around the water inlet hole 221.

The cartridge 230 is screw-connected to one end of the housing 110 that is opposite the portion of the housing 110 to which the connector 220 is coupled, such that it defines the storage chamber 212 in which the phase change material C is contained. The upper portion of the cartridge 230 is open so that one portion of the plunger 240 can be received into the cartridge 230. In addition, the lower portion of the cartridge 230 is opened and closed by a storage chamber stopper 231 so that the phase change material 20 can be supplied.

The plunger 240 is disposed inside the draining chamber 211 such that it is movable in the longitudinal direction. The plunger 240 has a piston 241 at one end thereof, the piston 241 being received inside the cartridge 230, and a valve 243 at the other end thereof, the valve 243 closing or opening the water inlet hole 221 depending on its position. A packing 232 is coupled to the upper surface of the valve 243 such that it provides a water seal when the water inlet hole 221 is closed. The packing 232 is elastically supported by a spring 231, in the direction toward the inside of the cartridge 230.

The valve for preventing freeze-fracturing of the second embodiment is automatically opened and closed depending on the temperature of ambient air in a similar fashion to that of the first embodiment.

Specifically, at a temperature where there is no danger of freeze-fracturing, the phase change material 20 inside the cartridge 230 remains in a liquid state, which is expanded, as shown in FIG. 7, and the upward pressure applied to the piston 241 causes the valve 243 to close the water inlet hole 221. When the temperature of ambient air drops close to the freezing temperature of water, as shown in FIG. 8, the phase change material decreases in volume while being solidified, so that the downward pressure applied to the piston 241 causes the valve 243 to open the water inlet hole 221. Consequently, the water inside the flow pipe 10 is introduced through the opened water inlet hole 221 and is then drained through the water outlet 213 to the outside, thereby protecting the pipe from freeze-fracturing.

Although the foregoing embodiment has been illustrated with respect to the structure in which the housing 110 and the connector 220 are provided as separate members and are coupled to each other, the housing 110 and the connector 120 may be formed integrally.

The present invention as set forth above is not limited to the foregoing embodiments and the accompanying drawings. It should be understood, however, that various substitutions, modifications and changes will be apparent to a person having ordinary skill in the art without departing from the scope of the present invention.

INDUSTRIAL APPLICABILITY

The valve for preventing freeze-fracturing using a phase change material of the present invention is applicable to water pipes of common buildings, a variety of facilities, such as cooling and heating air-conditioning facilities, refrigerating and freezing facilities, and industrial freezing facilities, and pipes of facilities. In particular, after the valve is installed, it can automatically drain water from a pipe in response to changes in temperature without additional manipulation or management, thereby protecting the pipe from freeze-fracturing. Unlike the related art, it is not required to install a heat-retaining article or a heating device in order to prevent freeze-fracturing. Energy is not consumed to operate the device, and there is no waste of water, which would otherwise occur in the process of circulating water. In addition, after the valve is installed, neither costs nor labor for maintenance are additionally consumed. Accordingly, the valve for preventing freeze-fracturing of the present invention can provide a low-cost high-efficiency means that is available for preventing freeze-fracturing which realizes.

The invention claimed is:

1. A valve for preventing freeze-fracturing, comprising:
a housing coupled to a pipe port of a flow pipe through which a fluid flows;
a draining chamber provided in a portion of the housing that faces the pipe port, wherein the draining chamber has therein a water inlet hole, which communicates with an inside of the flow pipe, and a water outlet hole, which communicates with an outside of the housing;
a storage chamber provided in a portion of the housing that is opposite the draining chamber, wherein the storage chamber contains therein a phase change material, which decreases in volume while changing in phase from liquid to solid; and
a plunger movably disposed in the draining chamber, wherein the plunger has a piston in one portion thereof, the piston being positioned inside the storage chamber such that the piston moves following a change in the volume of the phase change material, and a valve in the other portion thereof, the valve opening and closing the water inlet hole following a movement of the piston;
wherein the draining chamber and the storage chamber are integrated to the housing, wherein the housing has a piston hole between the draining chamber and the storage chamber, the piston of the plunger being received inside the piston hole; and
wherein the housing has a draining chamber stopper, which is screw-coupled to the draining chamber from an outside, the draining chamber stopper having the water inlet hole therein.

2. The valve of claim 1, wherein the housing has a storage chamber stopper, which is screw-coupled to the storage chamber from an outside, the storage chamber stopper having an inlet hole, which is opened or closed by an opening/closing bolt.

3. The valve of claim 1, wherein a valve seat is provided around the water inlet hole of the draining chamber stopper, and a packing is provided to form a seal between the valve of the plunger and the valve seat.

4. The valve of claim 1, wherein the housing has open both ends, wherein a connector, which forms the draining chamber, is provided in one end of the housing, and a cartridge, which forms the storage chamber, is provided in the other end of the housing.

5. The valve of claim 4, wherein the cartridge is a container, which is received in and is screw-coupled to the housing, and wherein a container stopper is coupled to a portion of the cartridge that is outside the housing, the container stopper being opened and closed in order to supply the phase change material.

6. The valve of claim 5, wherein a spring is provided inside the cartridge, the spring elastically supporting the piston of the plunger toward an inside of the cartridge.

7. The valve of claim 1, wherein the housing has a storage chamber stopper, which is screw-coupled to the storage chamber from an outside, the storage chamber stopper having an inlet hole, which is opened or closed by an opening/closing bolt.

8. The valve of claim 1, wherein a spring is provided in the draining chamber, the spring elastically supporting the plunger in a direction toward an inside of the storage chamber.

9. A valve for preventing freeze-fracturing, comprising:
a housing coupled to a pipe port of a flow pipe through which a fluid flows;
a draining chamber provided in a portion of the housing that faces the pipe port, wherein the draining chamber has therein a water inlet hole, which communicates with an inside of the flow pipe, and a water outlet hole, which communicates with an outside of the housing;
a storage chamber provided in a portion of the housing that is opposite the draining chamber, wherein the storage chamber contains therein a phase change material, which decreases in volume while changing in phase from liquid to solid; and
a plunger movably disposed in the draining chamber, wherein the plunger has a piston in one portion thereof, the piston being positioned inside the storage chamber such that the piston moves following a change in the volume of the phase change material, and a valve in the other portion thereof, the valve opening and closing the water inlet hole following a movement of the piston;
wherein the draining chamber and the storage chamber are integrated to the housing, wherein the housing has a piston hole between the draining chamber and the storage chamber, the piston of the plunger being received inside the piston hole; and
wherein a spring is provided in the draining chamber, the spring elastically supporting the plunger in a direction toward an inside of the storage chamber.

* * * * *